United States Patent [19]

Sakagami et al.

[11] Patent Number: 5,093,430

[45] Date of Patent: Mar. 3, 1992

[54] BLOCK COPOLYMER COMPOSITIONS AND PROCESS FOR THE PREPARATION THEREOF

[75] Inventors: Toshinori Sakagami; Yasuo Toyama; Hisaharu Ito; Takumi, Miyachi, all of Tokyo, Japan

[73] Assignee: Shell Internationale Research Maatschappij B.V., The Hague, Netherlands

[21] Appl. No.: 442,334

[22] PCT Filed: Mar. 25, 1988

[86] PCT No.: PCT/EP88/00271

§ 371 Date: Nov. 22, 1989

§ 102(e) Date: Nov. 22, 1989

[87] PCT Pub. No.: WO89/09242

PCT Pub. Date: Oct. 5, 1989

[51] Int. Cl.$^5$ .................. C08F 297/04; C08L 9/06
[52] U.S. Cl. .................. 525/314; 525/98; 525/271; 525/332.3; 525/333.1; 525/333.3; 525/370
[58] Field of Search .............. 525/98, 271, 314, 332.3, 525/333.1, 333.3, 370

[56] References Cited

U.S. PATENT DOCUMENTS

| | | | |
|---|---|---|---|
| 4,397,994 | 8/1983 | Takeuchi | 525/332.3 |
| 4,845,165 | 7/1989 | Halasa | 525/332.3 |

FOREIGN PATENT DOCUMENTS

| | | | |
|---|---|---|---|
| 0750466 | 1/1967 | Canada | 525/271 |
| 0171225 | 12/1986 | European Pat. Off. | |
| 2066270 | 7/1981 | United Kingdom | 525/98 |

*Primary Examiner*—Melvyn I. Marquis
*Assistant Examiner*—Vasu S. Jagannathan

[57] ABSTRACT

A block copolymer composition is provided comprising:

(1) 10–60% by weight of a block copolymer $[(A-B)_{11}]_m - Y_1$ (2) 20–90% by weight of a block copolymer $[(A-B)_{12}]_n - Y_2$, and (3) 0–50% by weight of a block copolymer $(A-B_{13}$, in which A represents a vinyl aromatic polymer block having a molecular weight of 10,000–30,000 wherein the vinyl aromatic compound is selected from the group consisting of styrene, alkyl substituted styrene and a vinyl naphtalene, $B_1$ a conjugated diene polymer block having a molecular weight of 25,000–100,000, $B_2$ a conjugated diene polymer block having a molecular weight at least 1.2 times as high as that of $B_1$ wherein the conjugated diene compound of $B_1$ and $B_2$ is a conjugated diene having four to eight carbon atoms per molecule, $Y_1$ and $Y_2$ respectively represent a halogenated, tetravalent silicon compound and a halogenated, tetravalent stannic compound and $11 = 1-3$, $m = 2-4$, $12 = 1-6$, $n = 2-4$ and $13 = 1-6$.

The block copolymer is prepared by the successive steps of (i) polymerizing the vinyl aromatic compound building block A and the conjugated diene compound building block $B_1$, (ii) adding a halogenated tetravalent silicon compound, (iii) adding and polymerizing the conjugated diene compound building block $B_2$ and (iv) adding a halogenated tetravalent stannic compound. The block copolymer is particularly useful in adhesive compositions.

9 Claims, No Drawings

BLOCK COPOLYMER COMPOSITIONS AND PROCESS FOR THE PREPARATION THEREOF

The invention relates to a block copolymer composition which is suitable for adhesive compositions. The invention also relates to an adhesive composition containing said block copolymer composition. The invention further relates to a process for the preparation of said block copolymer composition.

Generally, adhesives are used for forming the adhesive layers of adhesive tape, such as graft tape, labels and adhesive sheets. Suitable such adhesives are those that are moderately flowable when subjected to hot melt and which consequently can be applied as such onto a substrate as an adhesive layer, without the need of an organic solvent.

Such hot melt adhesives are known, for instance from Japanese Patent Specifications 50-56426 and 54-33536, but these known adhesives do not quite possess the tack and at the same time the retention force that are required of the layer of an adhesive sheet.

Research into such problems has resulted in a hot melt adhesive with excellent properties, prepared by using a block copolymer with a special structure which is coupled with an at least bifunctional halogenated silicon compound and a halogenated tin compound. The present invention offers block copolymer compositions which are useful as hot melt adhesives whose tack, bonding strength, retention strength and blocking resistance when applied in adhesive tape are all excellent. Accordingly, the invention provides a block copolymer composition which comprises the following components:

Component 1:
  in the range of from 10 to 60% by weight of a block copolymer represented by the general formula I $$[(A-B_1)l_1]_m-Y_1, \quad (I)$$

wherein A represents an aromatic vinyl compound polymer block having a molecular weight in the range of from 10,000 to 30,000 and $B_1$ a conjugated diene polymer block having a molecular weight in the range of from 25,000 to 100,000, $l_1$ is an integer in the range of from 1 to 3, m is an integer in the range of from 2 to 4 and $Y_1$ represents a halogenated silicon compound residue;

Component 2:
  in the range of from 20 to 90% by weight of a block copolymer represented by the general formula II $$[(A-B_2)l_2]_n-Y_2 \quad (II)$$

wherein A represents an aromatic vinyl compound polymer block having a molecular weight in the range of from 10,000 to 30,000 and $B_2$ a conjugated diene polymer block having a molecular weight that is at least 1.2 times as high as that of the conjugated diene polymer block $B_1$ in the general formula I, $l_2$ is an integer in the range of from 1 to 6, n is an integer in the range of from 2 to 4 and $Y_2$ represents a halogenated tin compound residue; and Component 3:
  in the range of from 0 to 50% by weight of a block copolymer represented by the general formula III $$(A-B_2)l_3, \quad (III)$$

wherein A represents an aromatic vinyl compound polymer block having a molecular weight in the range of from 10,000 to 30,000 and $B_2$ a conjugated diene polymer block having a molecular weight that is at least 1.2 times as high as that of the conjugated diene polymer block $B_1$ in the general formula I, and $l_3$ is an integer in the range of from 1 to 6.

The invention further provides a process for the preparation of a block copolymer composition according to the present invention which process is characterized in that the process is carried out in the presence of a hydrocarbon solvent and using an organic lithium compound as polymerization initiator, and in that the preparation comprises the following consecutive steps:

Step 1:
  a) polymerizing an aromatic vinyl compound until an aromatic vinyl compound polymer block A as defined in the general formula I having a molecular weight in the range of from 10,000 to 30,000 is obtained,
  b) adding a conjugated diene compound and polymerizing until a conjugated diene polymer block $B_1$ as defined in the general formula I and having a molecular weight in the range of from 25,000 to 100,000 is obtained,
  and optionally repeating step 1 one or two times;

Step 2:
  Adding a halogenated silicon compound and coupling in the range of from 10 to 60% of the total block copolymer formed in step 1 with formation of the residue $Y_1$ in the general formula I;

Step 3:
  Adding a conjugated diene compound again and polymerizing until the conjugated diene polymer block $B_2$, as defined in the general formula II and having a molecular weight in the range of from 30,000 to 300,000 is obtained; and Step 4:
  After step 3 adding a halogenated tin compound and coupling the aromatic vinyl compound-conjugated diene block copolymer formed in the afore-mentioned steps with formation of the residue $Y_2$ in the general formula II.

The components used to prepare the block copolymer compositions of the present invention are the following.

The aromatic vinyl compound used in the present invention may be, for example, styrene, α-methylstyrene, p-methylstyrene, m-methylstyrene, o-methylstyrene, p-tert-butylstyrene, a dimethylstyrene, and 1- and 2-vinylnaphthalene. Of these, styrene is preferred. Examples of conjugated diene compounds are those having in the range of from four to eight carbon atoms per molecule. Examples thereof are butadiene, isoprene and piperylene. Of these, isoprene is preferred.

According to a preferred embodiment of the present invention the halogenated silicon compound residue $Y_1$ in the general formula I and the halogenated tin compound residue $Y_2$ in the general formula II are derived from a halogenated tetravalent silicon compound having the general formula IV and a halogenated tin, i.e. halogenated, tetravalent stannic, compound having the general formula V, respectively,

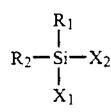

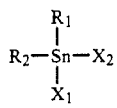

in which $R_1$ and $R_2$ each represent a hydrogen or halogen atom or an alkyl group having in the range of from 1 to 20 carbon atoms and $X_1$ and $X_2$ each represent a halogen atom.

Preferably, the residues $Y_1$ and $Y_2$ are derived from a silicon compound and a tin compound having the general formulae IV and V, respectively, in which $R_1$ and $R_2$ each represent an alkyl group having in the range of from 1 to 8 carbon atoms and $X_1$ and $X_2$ each represent a chlorine or bromine atom.

Examples of suitable compounds of the general formula IV are dichlorosilane, monomethyldichlorosilane, dimethyldichlorosilane, monoethyldichlorosilane, diethyldichlorosilane, monobutyldichlorosilane, dibutyldichlorosilane, monohexyldichlorosilane, dihexyldichlorosilane, dibromosilane, monomethyldibromosilane and dimethyldibromosilane. Very good results have been obtained with monomethyldichlorosilane.

Examples of suitable tin compounds of the general formula V are dichlorotin, dimethyldichlorotin, monoethyldichlorotin, diethyldichlorotin, methyltrichlorotin, monobutyldichlorotin, dibutyldibromotin, monohexyldichlorotin and tetrachlorotin. Very good results have been obtained with di-n-butyldichlorotin.

The hydrocarbon solvent used in the preparation of the block copolymers of the present invention may for instance be cyclopentane, cylcohexane, benzene, ethylbenzene, xylene and also mixtures of these with, for example, pentane, hexane, heptane and octane.

The organic lithium compound used as polymerization initiator may be for instance n-butyllithium, sec-butyllithium, tert-butyllithium, n-hexyllithium, iso-hexyllithium, phenyllithium, naphthyllithium, and is used in a quantity of 0.01-1.0% by weight, calculated on monomer.

If the molecular weight of the polymer block A of the aromatic vinyl compound is lower than 10,000, its retention force will be insufficient for its use as an adhesive, and a molecular weight higher than 30,000 will lead to poor tack.

The conjugated diene polymer molecular block $B_1$ preferably has a molecular weight in the range of from 30,000 to 70,000. If the molecular weight of block $B_1$ is lower than 25,000, tack will be poor and a molecular weight higher than 100,000 will lead to poor retention force.

Step 1 in the process according to the present invention may be repeated one or two times but is preferably not repeated. The halogenated silicon compound is preferably coupled with in the range of from 30 to 50% of the total block copolymer formed in step 1. A coupling percentage of less than 10 will lead to poor retention force, and a coupling percentage of higher than 60 to poor tack.

The conjugated diene polymer blocks $B_2$ in the general formulae II and III preferably have a molecular weight in the range of from 70,000 to 150,000.

If after step 4 more than 60% of the vinyl aromatic-conjugated diene block copolymer of the final block copolymer compositions has not been joined to the afore-mentioned halogenated silicon compound for coupling, the polymers obtained will be prone to blocking, which makes industrial production impossible.

The process according to the invention can be carried out by conducting the consecutive procedures at reaction conditions usually employed for polymerization and coupling; it may be carried out either by isothermal or by adiabatic polymerization. The temperature at which the polymerization is carried out typically lies in the range of from 30° to 120° C., preferably of from 50° to 80° C., and the coupling temperature typically lies in the range of from 30° to 120° C.

The block copolymer compositions according to the present invention preferably comprise 20-50% w, of the block copolymer of the general formula I and 30 to 77% of the block copolymer of the general formula II. Polymer block A in the general formulae I, II and III preferably has a molecular weight in the range of from 15,000 to 25,000. In the general formulae I and II $l_1$ and $l_2$ are preferably 1 and m and n are preferably 2.

The block copolymer composition according to the present invention, preferably contains in the range of from 3 to 40% by weight of the block copolymer of the general formula III. In the general formula III $l_3$ is preferably equal to 1.

In the afore-mentioned block copolymers, the molecular weight of $B_2$ in the general formulae II and III is suitably 1.5-15 times, preferably 1.7-10 times and more preferably still, 1.8-8 times that of $B_1$.

The said block copolymer composition comprises in the range of from 5 to 45% by weight, preferably 10 to 30% by weight, vinyl aromatic compound; if less than 5% by weight of vinyl aromatic compound is present, it will have poor retention force when mixed with a tackifying agent and with more than 45% by weight, its tack will be insufficient.

Said block copolymers when used as such as a tackifying component, make adhesives with surprisingly excellent tack and retention force.

When the block copolymer compositions of the present invention are used as adhesives, a tackifying agent is blended in. Such tackifying agents may be, for example, rosins, polyterpene resins, synthetic polyterpene resins, alicyclic hydrocarbon resins, cumarone resins, phenol resins, terpene-phenol resins, aromatic hydrocarbon resins, aliphatic hydrocarbon resins, of which rosins, polyterpene resins and alicyclic hydrocarbon resins are particularly preferred. These tackifying agents may be used singly or as a mixture of two or more. The amount of tackifying agent added typically lies in the range of from 20 to 300 pbw (parts by weight), preferably 20 to 200 pbw, more preferably 50 to 150 pbw, on 100 pbw of the afore-mentioned block copolymer compositions. If the amount of tackifying agent added lies outside this range, the appropriate level of tack and retention force will not be attained.

A softener may also be added to this blend. A naphthenic, paraffinic or aromatic process oil may be used as softener; these may be used singly or as a mixture of two or more. The amount of softener added is in the range of from 0 to 200 pbw, preferably 20 to 120 pbw, on 100 pbw of copolymer. If the amount of softener added exceeds 200 pbw, the softener will with time exude from the adhesive surface.

Apart from the above additives, stabilizers, such as anti-oxidants, ultraviolet absorbants, inorganic fillers, such as calcium carbonate, talc, clay, titania, silica, magnesium carbonate, carbon black, and colouring agents, may be added, if required.

The afore-mentioned components are placed in, for instance, a normal mixing vessel or a sealed kneader and mixed with heating to a temperature in the range of from 120° to 180° C., if required in a nitrogen gas atmosphere, to prepare the adhesive compositions according to the invention.

Since the adhesive compositions thus prepared can be formed into a tacky layer by applying them to a substrate, they can be efficiently used for, for example, all kinds of adhesive tapes, labels, linings for fixing all kinds of light weight plastic mould goods, linings for fixing carpets, and also as materials for adhesive layers for adhesive tapes and labels used for cold storage foods and in cold surroundings.

In addition to these uses, the compositions according to the present invention cover a wide range of uses, of which injection moulded goods, such as foot wear and containers, flow moulded goods, such as toys and household appliances, compression moulded goods, such as packings, sheets, plates, may be given as suitable examples. The block copolymer compositions of the present invention may also be blended with other rubbers, such as SBR and NBR and plastics, such as polystyrene, to improve their properties. For instance, their service in rubber is as improvers of crepe sponge and in plastics as shock resistance improvers for widely used polystyrenes. The block copolymer composition according to the present invention may also be blended with asphalt to improve the cold resistance of the asphalt.

The following examples further illustrate the invention.

The determination of characteristics was carried out with the aid of the following methods.

Tack; PSTC#6 Rolling Ball tack method

Steel spheres with a 1.11 cm diameter were rolled over a plate sloping at an angle of 21.5° and the distances at which they stopped rolling over a horizontal plate pasted with the tape samples were measured. Determination took place at an environmental temperature of 10° C., and a forward run of 15 cm.

Bonding force; JIS-Z-1522 180° C. friction test

An adhesive tape sample was cut into 10 mm wide strips, stuck onto a SUS 304 plate and subjected to friction at a pulling speed of 300 mm/min.

Retention force; JIS-Z-1524

An adhesive tape sample was cut into 15 mm wide strips and stuck to an SUS 304 plate over a fixed area of 15 mm×25 mm; a load of 1.2 kg was suspended from one side of the tape and the time it took for the plasted area to peel off and fall was recorded. The environmental temperature was 40° C.

Blocking resistance:

A sample of 50 g crumb sprinkled with 0.5% talc was placed in a 100 cm$^3$ beaker and the crumb sample was left for 3 days under a pressure of 9.8 kPa at 50° C. Then, the crumb sample was removed and allowed to drop from 1 m height. Its blocking resistance was found from the following equation $$\text{Blocking resistance} = \frac{50 - (\text{weight of blocked clusters of at least 3 crumbs})}{50}$$

The amount of styrene bonding was determined with infra red spectrometry.

EXAMPLE 1

Step 1(a)

An autoclave fitted with cleaned, dried stirrer and jacket was charged under nitrogen atmosphere with 1600 g of a 9/1 (volume) cyclohexane/n-pentane mixture and 0.12 g tetrahydrofuran; then the contents were brought to 60° C.

After addition of a hexane solution containing 0.5 g n-butyllithium, and then 38 g styrene, the mixture was polymerized for 60 minutes. The styrene polymerized quantitatively.

Step 1(b)

Next, 117 g isoprene was added and polymerized for 60 minutes. The isoprene polymerized quantitatively.

Step 2

Then, a cyclohexane solution containing 0.3 g monomethyldichlorosilane was added and coupling proceeded for 20 minutes.

Step 3

Another 245 g isoprene was added and polymerized for 60 minutes. The isoprene polymerized quantitatively.

Step 4

Finally, a cyclohexane solution containing 0.88 g di-n-butyl-dichlorotin was added and coupling proceeded for 20 minutes.

During the polymerization, the temperature was allowed to rise to 70° C. After termination of the polymerization, 2,6-di-tert-butyl-p-cresol was added to the polymer solution, and the cyclohexane was removed by heating to afford the block copolymer.

EXAMPLES 2–5 and COMPARATIVE EXPERIMENTS 1–4

Polymerization was carried out in the same way as in Example 1, and using the amounts of styrene, isoprene, silicon compound and tin compound given in Table 1. The results are listed in Table 2.

COMPARATIVE EXPERIMENTS 5 and 6

Polymerization was carried out in the same way as in Example 1, and using the amounts of styrene, isoprene and silicon compound given in Table 1, the difference being that Step 4 was omitted. The results are listed in Table 2.

TABLE 1

| | Styrene (g) | Isoprene (g) | Coupling Agent Type | Amount (g) | Isoprene (g) | Coupling Agent Type | Amount (g) |
|---|---|---|---|---|---|---|---|
| Exp. | | | | | | | |
| 1 | 38 | 117 | $CH_3SiHCl_2$ | 0.13 | 245 | $[CH_3(CH_2)_3]_2SnCl_2$ | |
| 2 | 45 | 142 | " | 0.22 | 213 | " | 0.63 |
| 3 | 52 | 112 | " | 0.13 | 236 | " | 0.88 |

TABLE 1-continued

| | Styrene (g) | Isoprene (g) | Coupling Agent Type | Coupling Agent Amount (g) | Isoprene (g) | Coupling Agent Type | Coupling Agent Amount (g) |
|---|---|---|---|---|---|---|---|
| 4 | 27 | 83 | " | 0.13 | 290 | " | 0.88 |
| 5 | 38 | 117 | " | 0.13 | 245 | " | 0.50 |
| Comp. Exp. | | | | | | | |
| 1 | 32 | 100 | " | 0.05 | 268 | " | 1.13 |
| 2 | 58 | 180 | " | 0.31 | 162 | " | 0.38 |
| 3 | 13 | 125 | " | 0.13 | 262 | " | 0.88 |
| 4 | 82 | 102 | " | 0.13 | 216 | " | 0.88 |
| 5 | 38 | 117 | " | 0.13 | 245 | — | — |
| 6 | 55 | 345 | " | 0.13 | — | — | — |

TABLE 2

| | Block Copolymer Composition | | | | | |
|---|---|---|---|---|---|---|
| | $[(A-B_2)]_2-Y_1$ Block Copolymer | | | $[(A-B_2)]_2-Y_2$ Block Copolymer | | |
| | Styrene Polymer mol. wt ($\times 10^4$) | Isoprene Polymer mol. wt ($\times 10^4$) | Mixing Proportion % | Styrene Polymer mol. wt ($\times 10^4$) | Isoprene Pol. ($B_2$) mol. wt ($\times 10^4$) | Mixing Proportion % |
| Exp. | | | | | | |
| 1 | 1.6 | 5.0 | 30 | 1.6 | 20 | 70 |
| 2 | 1.6 | 5.0 | 45 | 1.6 | 20 | 55 |
| 3 | 1.6 | 3.5 | 30 | 1.6 | 14 | 70 |
| 4 | 1.6 | 5.0 | 30 | 1.6 | 30 | 70 |
| 5 | 1.6 | 5.0 | 30 | 1.6 | 20 | 40 |
| Comp. Exp. | | | | | | |
| 1 | 1.6 | 5.0 | 10 | 1.6 | 20 | 90 |
| 2 | 1.6 | 5.0 | 70 | 1.6 | 20 | 30 |
| 3 | 0.5 | 5.0 | 30 | 0.5 | 20 | 70 |
| 4 | 4.0 | 5.0 | 30 | 4.0 | 20 | 70 |
| 5 | 1.6 | 5.0 | 30 | — | — | — |
| 6 | 1.6 | 10.0 | 30 | — | — | — |

| | Block Copolymer Composition $[(A-B_2)]_2$ Block Copolymer Mixing Proportion | Bonded Styrene (%) | Adhesive Properties | | | |
|---|---|---|---|---|---|---|
| | | | Tack (10° C.) (cm) | Bonding Force (23° C.) (g/cm) | Retention Force (40° C.) (min) | Blocking Resistance |
| Exp. | | | | | | |
| 1 | | 12.5 | 2 | 1060 | 104 | 0.93 |
| 2 | | 15.8 | 5 | 1060 | 110 | 0.93 |
| 3 | | 16.6 | 6 | 1080 | 122 | 0.95 |
| 4 | | 10.8 | 2 | 1000 | 88 | 0.90 |
| 5 | 30 | 12.5 | 2 | 1060 | 104 | 0.85 |
| Comp. Exp. | | | | | | |
| 1 | | 9.1 | 2 | 940 | 48 | 0.90 |
| 2 | | 19.2 | 21 | 1020 | 112 | 0.95 |
| 3 | | 4.4 | 2 | 830 | 21 | 0.65 |
| 4 | | 25.0 | 18 | 1040 | 121 | 0.98 |
| 5 | 70 | 12.5 | 2 | 1060 | 104 | 0.10 |
| 6 | 70 | 13.8 | 19 | 1080 | 88 | 0.10 |

Mixing ratio block copolymer composition/aliphatic petroleum resin/naphthenic process oil/age resistor = 100/100/40/4
(1) Exxon, Escoret 1310; (2) Exxon, Diana process oil MM 280; (3) Exxon, Sansera-BZ The block copolymer composition of the present invention when blended with a tackifier gives an adhesive having excellent tack, bonding force and retention force and moreover excellent blocking resistance. Consequently, it can be very suitably used in hot melt adhesives.

We claim:

1. A block copolymer composition which comprises the following components:

Component 1:
in the range of from 10 to 60% by weight of a block copolymer represented by the general formula I $$[(A-B_1)l_1]_m-Y_1, \tag{I}$$

wherein A represents an aromatic vinyl compound polymer block having a molecular weight in the range of from 10,000 to 30,000 herein the aromatic vinyl compound is selected from the group consisting of styrene, alkyl substituted styrene and a vinyl naphthalene; $B_1$ represents a conjugated diene polymer block having a molecular weight in the range of from 25,000 to 100,000 wherein the conjugated diene has in the range of from four to eight carbon atoms per molecule; $l_1$ is an integer in the range of from 1 to 3, m is an integer in the range of from 2 to 4 and $Y_1$ represents a halogenated, tetravalent silicon compound residue;

Component 2:
in the range of from 20 to 90% by weight of a block copolymer represented by the general formula II $$[(A-B_2)l_2]_n-Y_2 \tag{II}$$

wherein A represents an aromatic vinyl compound polymer block having a molecular weight in the range of from 10,000 to 30,000 wherein the aromatic vinyl compound is selected from the group consisting of styrene, alkyl substituted styrene and a vinyl naphthalene; $B_2$ represents a conjugated diene polymer block having a molecular weight that is at least 1.2 times as high as that of the conjugated diene polymer block $B_1$ in the general formula I, wherein the conjugated diene has in the range of from four to eight carbon atoms per molecule; $l_2$ is an integer in the range of from 1 to 6, n is an integer in the range of from 2 to 4 and $Y_2$ represents a halogenated tetravalent stannic compound residue; and Component 3:

in the range of from 0 to 50% by weight of a block copolymer represented by the general formula III $$(A-B_2)l_3. \quad \text{(III)}$$

wherein A represents an aromatic vinyl compound polymer block having a molecular weight in the range of from 10,000 to 30,000, wherein the aromatic vinyl compound is selected from the group consisting of styrene, alkyl substituted styrene and a vinyl naphthalene; $B_2$ represents a conjugated diene polymer block having a molecular weight that is at least 1.2 times as high as that of the conjugated diene polymer block $B_1$ in the general formula I, wherein the conjugated diene has in the range of from four to eight carbon atoms per molecule; and $l_3$ is an integer in the range of from 1 to 6.

2. A block copolymer composition as claimed in claim 1, in which A in the general formulae I, II and III represents a styrene polymer block.

3. A block copolymer composition as claimed in claim 1 in which the conjugated diene of each conjugated diene polymer block is selected from the group consisting of butadiene, isoprene and piperylene.

4. A block copolymer composition as claimed in claim 3 in which the conjugated diene is isoprene.

5. A block copolymer composition as claimed in any one of claims 1, 2, 3 or 4 in which the halogenated tetravalent silicon compound residue $Y_1$ in the general formula I and the halogenated tetravalent stannic compound residue $Y_2$ in the general formula II are derived from a halogenated tetravalent silicon compound having the general formula IV and a halogenated tetravalent stannic compound having the general formula V, respectively, $$\begin{array}{c} R_1 \\ | \\ R_2-Si-X_2 \\ | \\ X_1 \end{array} \quad \text{(IV)}$$

and $$\begin{array}{c} R_1 \\ | \\ R_2-Sn-X_2 \\ | \\ X_1 \end{array} \quad \text{(V)}$$

in which $R_1$ and $R_2$ each represent a hydrogen or halogen atom or an alkyl group having in the range of from 1 to 20 carbon atoms and $X_1$ and $X_2$ each represent a halogen atom.

6. A block copolymer composition as claimed in claim 5 in which the residues $Y_1$ and $Y_2$ are derived from a halogenated tetravalent silicon compound and a tetravalent stannic compound having the general formulae IV and V, respectively, in which $R_1$ and $R_2$ each represent an alkyl group having in the range of from 1 to 8 carbon atoms and $X_1$ and $X_2$ each represent a chlorine or bromine atom.

7. A block copolymer composition as claimed in claim 1 which comprises
in the range of from 20 to 50% by weight of component 1;
in the range of from 30 to 77% by weight of component 2; and
in the range of from 3 to 40% by weight of component 3, the sum of the percentages being 100.

8. A shaped article containing a block copolymer composition as claimed in claim 1.

9. A process for the preparation of a block copolymer composition as claimed in claim 1 characterized in that the process is carried out in the presence of a hydrocarbon solvent and using an organic lithium compound as polymerization initiator, and in that the preparation comprises the following consecutive steps:

Step 1:
a) polymerizing styrene, alkyl substituted styrene or a vinyl naphthalene until an aromatic vinyl compound polymer block A as defined in the general formula I having a molecular weight in the range of from 10,000 to 30,000 is obtained,
b) adding a conjugated diene compound having four to eight carbon atoms per molecule and polymerizing until a conjugated diene polymer block $B_1$ as defined in the general formula I and having a molecular weight in the range of from 25,000 to 100,000 is obtained, and optionally repeating step 1 one or two times;

Step 2:
adding a halogenated tetravalent silicon compound and coupling in the range of from 10 to 60% of the total block copolymer formed in step 1 with formation of the residue $Y_1$ in the general formula I;

Step 3:
adding said conjugated diene compound again and polymerizing until the conjugated diene polymer block $B_2$, as defined in the general formula II and having a molecular weight in the range of from 30,000 to 300,000 is obtained; and Step 4:
after step 3 adding a halogenated tetravalent stannic compound and coupling the block copolymer formed in the afore-mentioned steps with formation of the residue $Y_2$ in the general formula II.

* * * * *